United States Patent
Kitano

(10) Patent No.: US 8,322,475 B2
(45) Date of Patent: Dec. 4, 2012

(54) ELECTRIC MOTOR DRIVE APPARATUS AND VEHICLE INCLUDING THE SAME

(75) Inventor: Eiji Kitano, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1021 days.

(21) Appl. No.: 12/093,888

(22) PCT Filed: Jan. 5, 2007

(86) PCT No.: PCT/JP2007/050369
§ 371 (c)(1),
(2), (4) Date: May 15, 2008

(87) PCT Pub. No.: WO2007/086263
PCT Pub. Date: Aug. 2, 2007

(65) Prior Publication Data
US 2009/0255744 A1    Oct. 15, 2009

(30) Foreign Application Priority Data
Jan. 27, 2006    (JP) .................................. 2006-019341

(51) Int. Cl.
*B60L 15/36* (2006.01)
(52) U.S. Cl. ...................... 180/65.8; 701/22; 180/65.285
(58) Field of Classification Search .................. 180/65.1, 180/65.285, 65.265, 65.275; 701/22
See application file for complete search history.

(56) References Cited

U.S. PATENT DOCUMENTS

| | | | | |
|---|---|---|---|---|
| 4,291,265 A * | 9/1981 | Kawada et al. | ............... | 318/782 |
| 4,314,191 A * | 2/1982 | Kawada et al. | ............... | 318/802 |
| 5,245,294 A * | 9/1993 | Kumar | .......................... | 324/677 |
| 5,304,912 A | 4/1994 | Kajiwara et al. | | |
| 6,852,054 B2 * | 2/2005 | Tumback et al. | .................. | 475/5 |
| 7,099,756 B2 * | 8/2006 | Sato | ................................. | 701/22 |
| 7,109,605 B2 * | 9/2006 | Habu | ............................... | 307/39 |
| 7,819,213 B2 * | 10/2010 | Oyobe et al. | ................ | 180/65.27 |
| 2004/0263099 A1 | 12/2004 | Maslov et al. | | |
| 2005/0162023 A1 | 7/2005 | Habu | | |
| 2009/0058339 A1 | 3/2009 | Kitano | | |

FOREIGN PATENT DOCUMENTS
EP    0 446 994 A2    9/1991
(Continued)

OTHER PUBLICATIONS

Online machine translation of claims and description of Natsuki JP2005-130615A) obtained via JPO and INPIT.*

(Continued)

*Primary Examiner* — J. Allen Shriver, II
*Assistant Examiner* — Travis Coolman
(74) *Attorney, Agent, or Firm* — Sughrue Mion, PLLC

(57) ABSTRACT

When fail signals from first and second inverters are rendered inactive, i.e., when all inverters are proper, an ECU renders first and second shut down permit signals active for output to first and second AND gates regardless of the operating state of motor generators. The first AND gate takes an AND operation of the fail signal from the second inverter and the first shut down permit signal to output a shut down signal to the first inverter. The second AND gate takes an AND operation of the fail signal from the first inverter and the second shut down permit signal to provide a shut down signal to the second inverter.

6 Claims, 5 Drawing Sheets

FOREIGN PATENT DOCUMENTS

| | | |
|---|---|---|
| EP | 1 542 348 A1 | 6/2005 |
| JP | 59-117497 A | 7/1984 |
| JP | 5091601 A | 4/1993 |
| JP | 11-262101 A | 9/1999 |
| JP | 2004112883 A | 4/2004 |
| JP | 2004-159412 A | 6/2004 |
| JP | 2005-130615 A | 5/2005 |
| JP | 2005130615 A * | 5/2005 |
| JP | 2007-236013 A | 9/2007 |

OTHER PUBLICATIONS

Japanese Office Action dated Nov. 22, 2011, issued in Application No. 2006-019341 with English language translation.

Japanese Office Action dated Mar. 29, 2011 in corresponding JP Application No. 2006-019341.

* cited by examiner

ELECTRIC MOTOR DRIVE APPARATUS AND VEHICLE INCLUDING THE SAME

TECHNICAL FIELD

The present invention relates to an electric motor drive apparatus and a vehicle including the electric motor drive apparatus. Particularly, the present invention relates to an electric motor drive apparatus driving a plurality of electric motors and a vehicle including the electric motor drive apparatus.

BACKGROUND ART

Recently, great attention is focused on hybrid vehicles having a storage device, an inverter, and an electric motor driven by an inverter, mounted as the driving source, in addition to a conventional engine.

Japanese Patent Laying-Open No. 2005-130615 discloses a motor drive apparatus mounted on such a hybrid vehicle to drive a plurality of motor generators. The motor drive apparatus includes a DC (Direct Current) power source, a capacitor, first and second inverters driving first and second motor generators, respectively, and a control device. The control device includes first and second AND gates, and an ECU (Electronic Control Unit).

In the case where the electric power generated by the first motor generator exceeds a threshold value when the first and second motor generators are in a regeneration mode and a power running mode, respectively, in this motor drive apparatus, the ECU generates aid provides to the first AND gate a shut down permit signal to permit shut down of the first inverter. The second inverter generates a fail signal upon detecting excessive current and provides the fail signal to the first AND gate. The first AND gate takes the AND operation of the shut down permit signal from the ECU and the fail signal from the second inverter to provide a shut down signal to the first inverter.

In the case where a fail signal is output from the second inverter when the electric power generated by the first motor generator is great, the first inverter is shut down according to the motor drive apparatus. Therefore, the first and second inverters and the capacitor can be protected from damage caused by excessive voltage.

Since determination of whether the electric power generated by the first motor generator is large or not is made in software by the ECU in the aforementioned motor drive apparatus, voltage rise may occur due to delay in the operation process. A large voltage rise occurs when the regenerated power increases abruptly. Margin in the capacitor (margin in capacitance of capacitor) must be ensured in consideration of such operation delay in the motor drive apparatus, which in turn will increase the capacitor.

Furthermore, when the first inverter is shut down in response to a fail signal from the second inverter in the motor drive apparatus, the shut down of the first inverter is not canceled until the second inverter attains a proper state. Therefore, a limp-home mode (flexible form) using the first motor generator when the second inverter is in error cannot be implemented.

DISCLOSURE OF THE INVENTION

In view of the foregoing, an object of the present invention is to provide an electric motor drive apparatus that can have the margin of a capacitor reduced.

Another object of the present invention is to provide an electric motor drive apparatus that can implement limp-home using a motor generator corresponding to an inverter other than the inverter that is in error.

A further object of the present invention is to provide a vehicle including an electric motor drive apparatus that can have the margin of a capacitor reduced.

Still another object of the present invention is to provide a vehicle that allows limp-home running using a motor generator corresponding to an inverter other than the inverter that is in error.

According to an aspect of the present invention, an electric motor drive apparatus driving n (n is a natural number of at least 2) electric motors in a power running mode or a regeneration mode includes: a capacitive element smoothing DC voltage; n drive devices connected parallel to the capacitive element, each driving a corresponding electric motor based on DC voltage from the capacitive element, and rendering active a fail signal for output when detecting a predetermined error; a control device receiving a fail signal from each of the n drive devices, and generating n shut down permit signals to permit shut down of the n drive devices based on the received n fail signals; and n shut down circuits provided corresponding to the n drive devices to output to a corresponding drive device a shut down signal designating shut down of the corresponding drive device in the event of at least one of n−1 fail signals received from n−1 drive devices other than the corresponding drive device is rendered active when the corresponding shut down permit signal received from the control device is active. The control device renders active n shut down permit signals for output to the n shut down circuits regardless of the power generating state of the n electric motors when n fail signals are inactive.

Preferably, the control device renders inactive, when a predetermined condition is established after a driving device is shut down in response to a shut down signal from a corresponding shut down circuit, the shut down permit signal corresponding to the shut down drive device.

Further preferably, the predetermined condition is established when a limp-home operation by the electric motor corresponding to the shut down drive device is allowed.

Preferably, the predetermined error is detected when excessive current flows to the semiconductor device included in the corresponding drive device.

According to the present invention, a vehicle includes an internal combustion engine, n (n is a natural number of at least 2) electric motors, and the electric motor drive apparatus set forth above. The n electric motors include first and second motor generators. The n drive devices include first and second inverters driving the first and second motor generators, respectively. The n shut down circuits include first and second shut down circuits corresponding to the first and second inverters, respectively. The first motor generator generates electric power using the output of the internal combustion engine. The second motor generator generates the motive power of the vehicle.

Preferably, the control device renders inactive the shut down permit signal corresponding to the first inverter when determination is made that limp-home running by the first motor generator and internal combustion engine is allowed following shut down of the first inverter in response to a shut down signal from the first shut down circuit.

Since the control device renders active n shut down permit signals regardless of the electric power generating state of the n electric motors when n fail signals are inactive, each of the n shut down circuits immediately renders active a shut down signal designating shut down of a corresponding drive device and outputs the activated shut down signal to the corresponding drive device when at least one of n−1 fail signals received from n−1 drive devices other than the corresponding drive device is rendered active. In other words, delay in the operation process will not occur when a shut down signal is rendered active in response to a fail signal.

In accordance with the present invention, the margin of a capacitive element taking into consideration delay in the operation process does not have to be ensured. Therefore, the margin of the capacitive element can be reduced. As a result, the size of the capacitive element can be reduced.

When a predetermined condition is established following shut down of a drive device in response to a shut down signal from a corresponding shut down circuit, the control device renders inactive the shut down permit signal corresponding to the shut down drive device. Therefore, another drive device is operable even if the drive device rendering the fail signal active is stopped.

According to the present invention, limp-home using an electric motor corresponding to a drive device other than the drive device in error can be implemented.

Since the control device renders inactive, when determination is made that limp-home running by the first motor generator and internal combustion engine is allowed following shut down of the first inverter in response to a shut down signal from the first shut down circuit, the shut down permit signal corresponding to the first inverter, the first inverter is operable even if the second inverter rendering the fail signal active is stopped.

According to the present invention, limp-home running using the first motor generator and internal combustion engine when the second inverter is in error can be conducted.

BEST MODES FOR CARRYING OUT THE INVENTION

Figure 1:
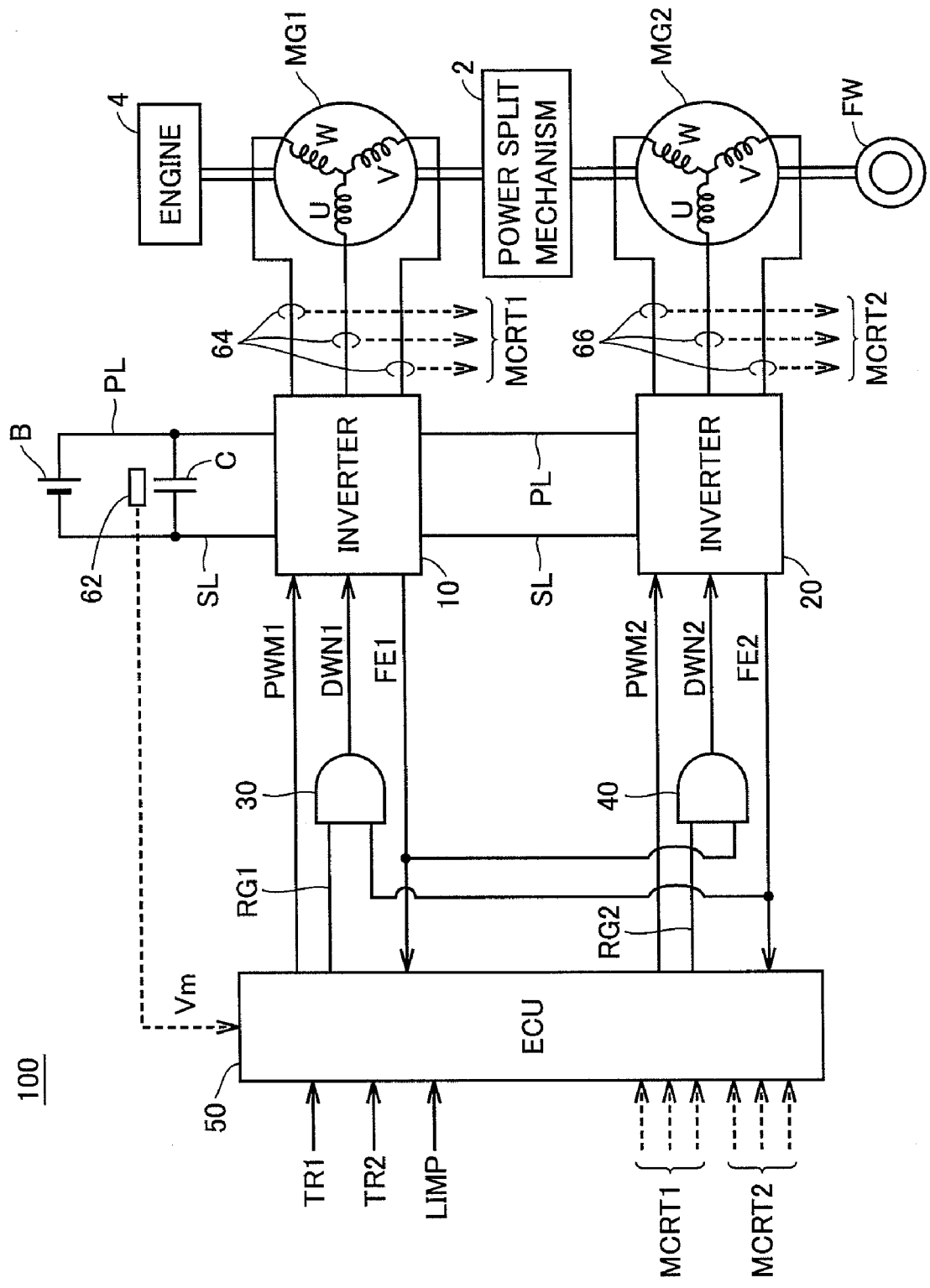
FIG. 1 is a schematic block diagram of a hybrid vehicle indicated as an example of a vehicle according to a first embodiment of the present invention.

Embodiments of the present invention will be described in detail with reference to the drawings. In the drawings, the same or corresponding elements have the same reference characters allotted, and the description thereof will not be repeated.

First Embodiment

Referring to FIG. 1, a hybrid vehicle 100 includes a wheel FW, a power split mechanism 2, an engine 4, and motor generators MG1 and MG2. Hybrid vehicle 100 also includes a storage device B, a capacitor C, inverters 10 and 20, a power supply line PL, a ground line SL, a voltage sensor 62, and current sensors 64 and 66. Additionally, hybrid vehicle 100 includes AND gates 30 and 40, and an electric control unit (hereinafter, also referred to as "ECU") 50.

Power split mechanism 2 is coupled to engine 4 and motor generators MG1 and MG2 to split power therebetween. For power split mechanism 2, a planetary gear mechanism including the three rotational shafts of a sun gear, a planetary carrier and a ring gear can be used. These three rotational shafts are connected to each rotational shaft of engine 4 and motor generators MG1 and MG2. For example, by passing the crankshaft of engine 4 through the center of the hollow rotor of motor generator MG1, engine 4 and motor generators MG1 and MG2 can be connected mechanically to power split mechanism 2.

The rotational shaft of motor generator MG2 is coupled to wheel FW by a reduction gear and/or actuating operation gear not shown. Further, a reduction gear for the rotational shaft of motor generator MG2 can be incorporated in power split mechanism 2.

Motor generator MG1 is incorporated into hybrid vehicle 100 as a power generator driven by engine 4 and as an electric motor capable of startup of engine 4. Motor generator MG2 is incorporated into hybrid vehicle 100 as an electric motor that drives wheel FW qualified as a driving wheel.

Storage device B is a rechargeable DC power source, formed, of a secondary battery such as of nickel hydride or lithium ion, for example. Storage device B supplies DC power to inverters 10 and 20. Storage device B receives the DC power output onto power supply line PL from inverters 10 and 20 to be charged. A capacitor of a large capacitance can be used for storage device B.

Capacitor C smoothes the voltage between power supply line PL and ground line SL. Voltage sensor 62 detects voltage Vm across capacitor C and provides the detected voltage Vm to ECU 50.

Inverters 10 and 20 are provided corresponding to motor generators MG1 and MG2, respectively. Inverter 10 drives motor generator MG1 in a power running mode or regeneration mode based on a signal PWM1 from ECU 50. When excessive current flows due to error in motor generator MG1, inverter 10 renders active a fail signal FE1 output to AND gate 40 and ECU 50. Inverter 10 is shut down when a shut down signal DWN1 from AND gate 30 is rendered active.

Inverter 20 drive motor generator MG2 in a power running mode or regeneration mode based on a signal PWM2 from ECU 50. When excessive current flows due to an error or the like at motor generator MG2, inverter 20 renders active a fail signal FE2 output to AND gate 30 and ECU 50. Inverter 20 is shut down when a shut down signal DWN2 received from AND gate 40 is rendered active.

The mechanism of generation of fail signals FE1 and FE2 by inverters 10 and 20, respectively, will be described afterwards.

Current sensor 64 detects motor current MCRT1 flowing through motor generator MG1, and provides the detected motor current MCRT1 to ECU 50. Current sensor 66 detects a motor current MCRT2 flowing through motor generator MG2 to provide the detected motor current MCRT2 to ECU 50.

AND gate 30 takes the AND operation of fail signal FE2 from inverter 20 and a shut down permit signal RG1 from ECU 50, and provides the operation result to inverter 10 as shut down signal DWN1. AND gate 40 takes the AND operation of fail signal FE1 from inverter 10 and shut down permit signal RG2 from ECU 50 to provide the operation result to inverter 20 as shut down signal DWN2.

ECU 50 receives voltage Vm from voltage sensor 62 and motor currents MCRT1 and MCRT2 from current sensors 64 and 66, respectively. ECU 50 receives torque command values TR1 and TR2 from an external ECU not shown.

Based on these signals, ECU 50 generates signals PWM1 and PWM2 used to drive motor generators MG1 and MG2, respectively, by a method that will be described afterwards, and provides the generated signals PWM1 and PWM2 to inverters 10 and 20, respectively.

ECU 50 receives fail signals FE1 and FE2 from inverters 10 and 20, respectively, and a limp-home signal LIMP from an external ECU. Based on these signals, ECU 50 generates shut down permit signals RG1 and RG2 to permit shut down of inverters 10 and 20, respectively, by a method that will be described afterwards, and outputs the generated shut down permit signals RG1 and RG2 to AND gates 30 and 40, respectively.

Figure 2:
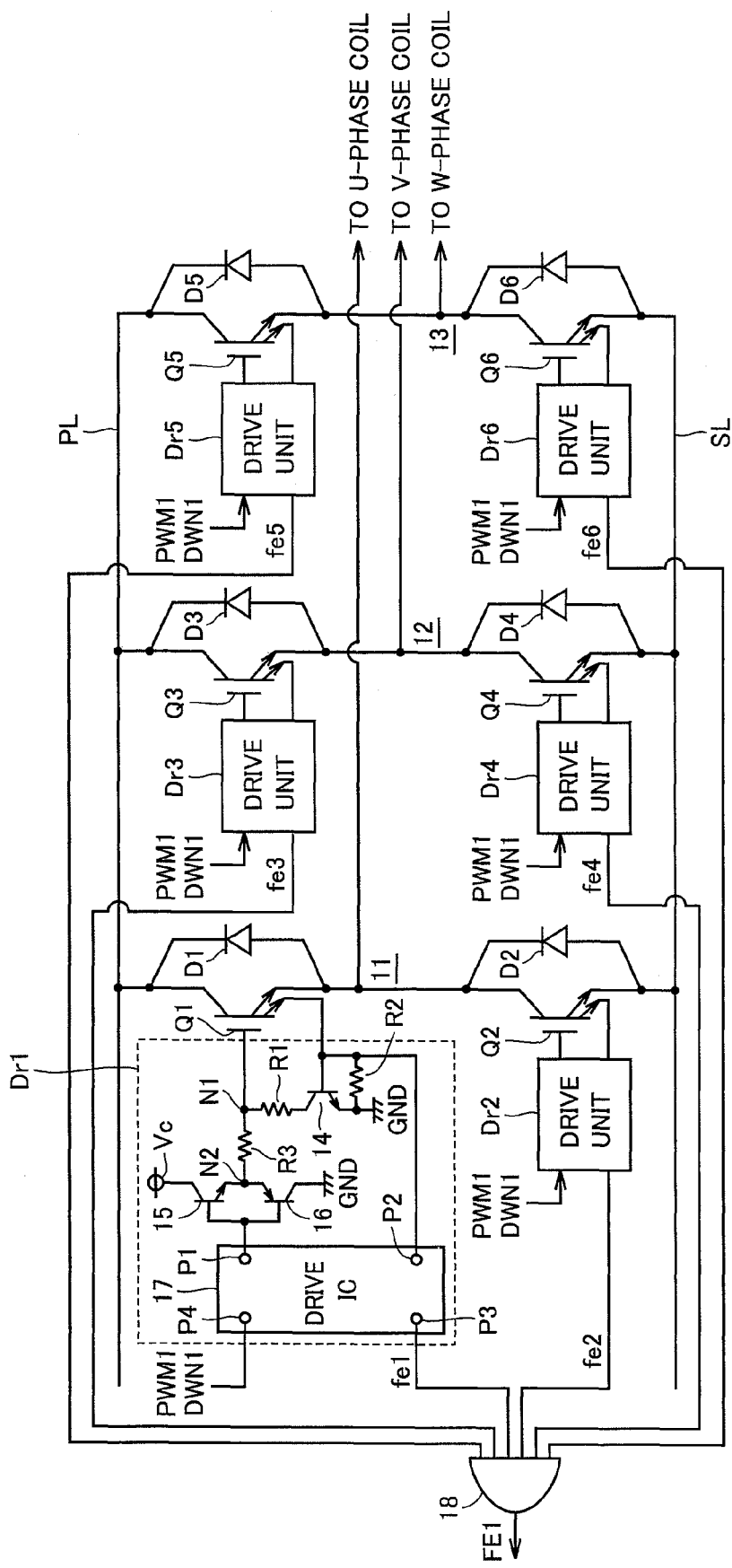
FIG. 2 is a circuit diagram of the inverter in FIG. 1.

FIG. 2 is a circuit diagram of inverter 10 of FIG. 1. Inverter 20 has a circuit configuration similar to that of inverter 10. The circuit configuration of inverter 10 is shown in FIG. 2 as a representative thereof.

Referring to FIG. 2, inverter 10 includes an U-phase arm 11, a V-phase arm 12, a W-phase arm 13 and an OR gate 18. U-phase arm 11, V-phase arm 12 and W-phase arm 13 are connected in parallel between power supply line PL and ground line SL.

U-phase arm 11 is formed of IGBTs (Insulated Gate Bipolar Transistors) Q1 and Q2, diodes D1 and D2, and drive units Dr1 and Dr2. IGBTs Q1 and Q2 are connected in series between power supply line PL and ground line SL. Diodes D1 and D2 are connected anti-parallel to IGBTs Q1 and Q2, respectively.

Drive unit Dr1 is connected to the emitter of IGBT Q1 so as to split the current across the collector and emitter of IGBT Q1. Drive unit Dr1 includes npn transistors 14 and 15, a pnp transistor 16, resistors R1-R3, and a drive IC 17. Npn transistor 14 is connected between resistor R1 and a ground node GND. In this case, the collector is connected to resistor R1 and the emitter is connected to ground node GND. The base is connected to the emitter of IGBT Q1 so as to split the current across the collector and emitter of IGBT Q1. Resistor R1 is connected between a node N1 and the collector of npn transistor 14. Node N1 is connected to the base of IGBT Q1.

Resistor R2 is connected between the base of npn transistor 14 and ground node GND. Resistor R3 is connected between node N1 and a node N2. Npn transistor 15 and pnp transistor 16 are connected in series between power supply node Vc and ground node GND. Npn transistor 15 has its collector connected to power supply node Vc and its emitter connected to the emitter of pnp transistor 16. The collector of pnp transistor 16 is connected to ground node GND. Node N2 is the connection node between npn transistor 15 and pnp transistor 16.

Drive IC 17 includes ports P1-P4. Port P1 is connected to the bases of npn transistor 15 and pnp transistor 16. Port P2 is connected to the base of npn transistor 14. Port P3 provides a signal fe1 to OR gate 18. Port P4 receives shut down signal DWN1 from AND gate 30, and receives signal PWM1 from ECU 50.

When excessive current occurs at IGBT Q1, npn transistor 14 is turned on and the base voltage of IGBT Q1 becomes lower. IGBT Q1 reduces the current across the collector and emitter. Drive IC 17 receives excessive current at port P2. When the voltage applied to port P2 exceeds a predetermined threshold value, IGBT Q1 is turned off from port P1. Signal fe1 is generated from port P3 to be output to OR gate 18. Specifically, drive IC 17 outputs a voltage of 0V from port P1 to the bases of npn transistor 15 and pnp transistor 16 to set the voltage at node N1 to 0V, whereby IGBT Q1 is turned off.

Upon receiving shut down signal DWN1 at port P4, drive IC 17 outputs from port P1 to the bases of npn transistor 15 and pnp transistor 16 a voltage of 0V to turn off IGBT Q1. Further, drive IC 17 responds to signal PWM1 to output a predetermined voltage from port P1 to the bases of npn transistor 15 and pnp transistor 16, whereby IGBT Q1 is switched in accordance with signal PWM1.

Drive units Dr2-Dr6 are connected to the emitters of IGBT Q2-IGBT Q6, respectively, to split the current across the collector and emitter of IGBT Q2-IGBT Q6. Each of drive units Dr2-Dr6 has a configuration similar to that of drive unit Dr1. Drive units Dr2-Dr6 turn off IGBT Q2-IGBT Q6, respectively, based on shut down signal DWN1, and controls the switching of IGBT Q2-IGBT Q6 based on signal PWM1. Each of drive units Dr2-Dr6 generates signals fe2-fe6 upon detecting excessive current at IGBT Q2-IGBT Q6, and provides the generated signals fe2-fe6 to OR gate 18.

OR gate 18 receives signals fe1-fe6 from drive units Dr1-Dr6, and takes an AND operation of the received signals fe1-fe6 to generate fail signal FE1. OR gate 18 outputs the generated fail signal FE1 to AND gate 40 and ECU 50.

The intermediate points of arms of U, V and W phases are connected to coils of U, V, and W phases of motor generator MG1, respectively. Motor generator MG1 is a 3-phase permanent magnet motor, having one end of the three coils of the U, V, and W phases connected in common. The intermediate point of IGBTs Q1 and Q2 is connected to the other end of the U-phase coil. The intermediate point of IGBTs Q3 and Q4 is connected to the other end of the V-phase coil. The intermediate point of IGBTs Q5 and Q6 is connected to the other end of the W-phase coil.

At inverter 20, OR gate 18 generates fail signal FE2 by the method set forth above, and outputs the generated fail signal FE2 to AND gate 30 and ECU 50.

Figure 3:
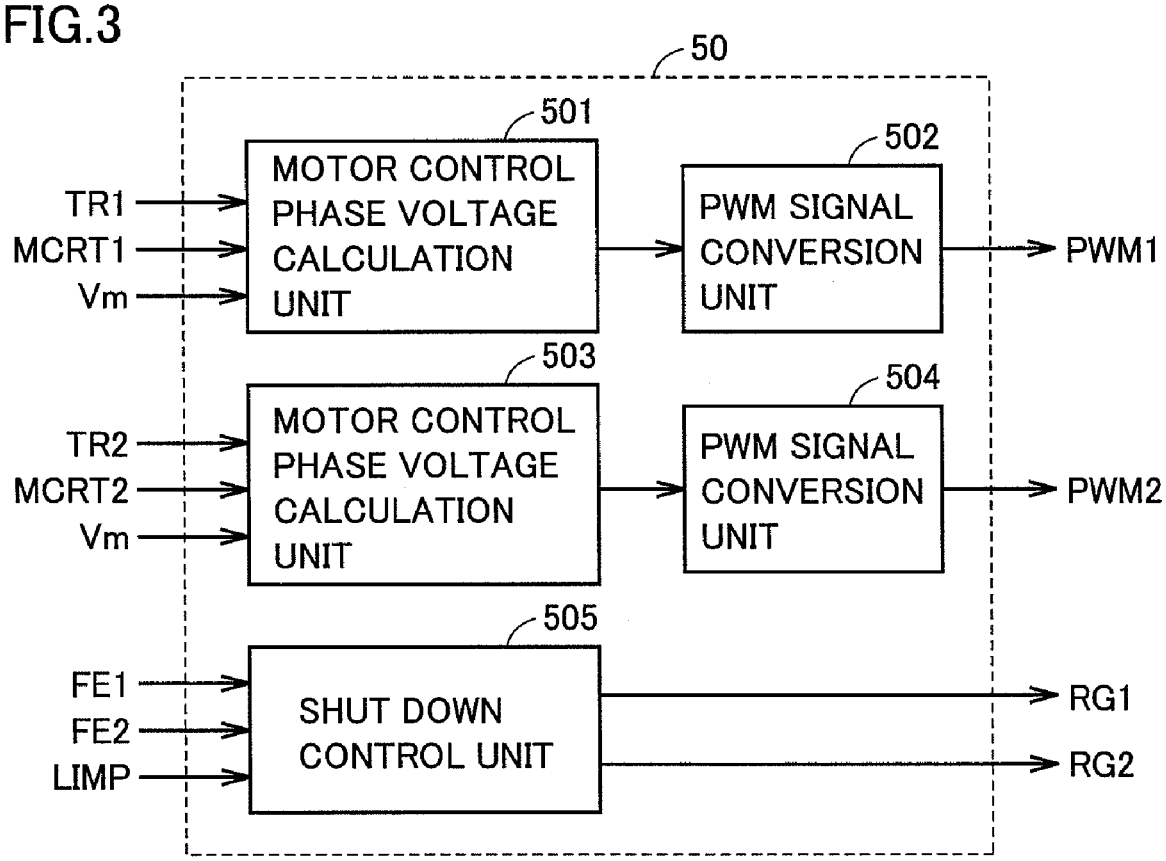
FIG. 3 is a functional block diagram of the ECU in FIG. 1.

Referring to the functional block diagram of FIG. 3, ECU 50 includes phase voltage calculation units 501 and 503 for motor control, PWM signal conversion units 502 and 504, and a shut down control unit 505.

Motor control phase voltage calculation unit 501 calculates the voltage command value corresponding to the voltage to be applied to each phase coil of motor generator MG1 based on a torque command value TR1, motor current MCRT1, and voltage Vm. The calculated voltage command value of each phase is output to PWM signal conversion unit 502. PWM signal conversion unit 502 generates a signal PWM1 to turn on/off each of IBGTs Q1-Q6 of inverter 10 based on the voltage command value of each phase received from motor control phase voltage calculation unit 501, and provides the generated signal PWM1 to each of drive units Dr1-Dr6 of inverter 10.

Accordingly, drive units Dr1-Dr6 of inverter 10 control the switching of IGBTs Q1-Q6 of inverter 10, and controls the current flow to each phase coil of motor generator MG1 such that motor generator MG1 generates the designated torque. Thus, the motor drive current of motor generator MG1 is controlled, whereby motor torque corresponding to torque command value TR1 is generated.

Motor control phase voltage calculation unit 503 calculates the voltage command value corresponding to the voltage to be applied to each phase coil of motor generator MG2 based on a torque command value TR2, motor current MCRT2, and voltage Vm to provide the calculated voltage command value of each phase to PWM signal conversion unit 504, PWM signal conversion unit 504 generates a signal PWM2 to turn on/off each of IGBTs Q1-Q6 of inverter 20 based on the voltage command value of each phase received from motor control phase voltage calculation unit 503 to provide the generated signal PWM2 to each of drive units Dr1-Dr6 of inverter 20.

Thus, the current flow to each phase coil is controlled such that motor generator MG2 generates the designated torque, whereby motor torque corresponding to torque command value TR2 is generated.

When both of a fail signals FE1 and FE2 are inactive, i.e. when both of inverters 10 and 20 are proper, shut down control unit 505 renders shut down permit signals RG1 and RG2 active and provides the same to AND gates 30 and 40, respectively.

When fail signal FE2 is active, i.e. an error is detected at inverter 20, shut down control unit 505 renders inactive shut down permit signal RG1 corresponding to inverter 10 for output to AND gate 30 when limp-home signal LIMP from an external ECU is active.

Limp-home signal LIMP is rendered active when limp-home running is allowed using a corresponding motor generator when one of inverters 10 and 20 is stopped by a shut down signal. Limp-home signal LIMP may be generated by determining whether in a limp-home allowable state or not by an external ECU. Alternatively, a button permitting limp-home running can be provided, which is rendered active when operated by the driver.

When shut down permit signal RG1 is rendered inactive, AND gate 30 renders shut down signal DWN1 inactive. The shut down state of inverter 10 is canceled, so that motor generator MG1 is operable. Accordingly, limp-home running by engine 4 using motor generator MG1, i.e. engine-direct-running of transmitting the power of engine 4 to wheel FW by means of power split mechanism 2, is allowed.

When limp-home signal LIMP received from an external ECU is rendered active in the case where fail signal FE1 is active, i.e. when an error is detected at inverter 10, shut down control unit 505 renders shut down permit signal RG2 corresponding to inverter 20 inactive, and outputs inactive shut down permit signal RG2 to AND gate 40. Accordingly, AND gate 40 renders inactive shut down signal DWN2, whereby the shut down state of inverter 20 is canceled, and motor generator MG2 is operable. Thus, limp-home running using motor generator MG2 alone is allowed.

Figure 4:
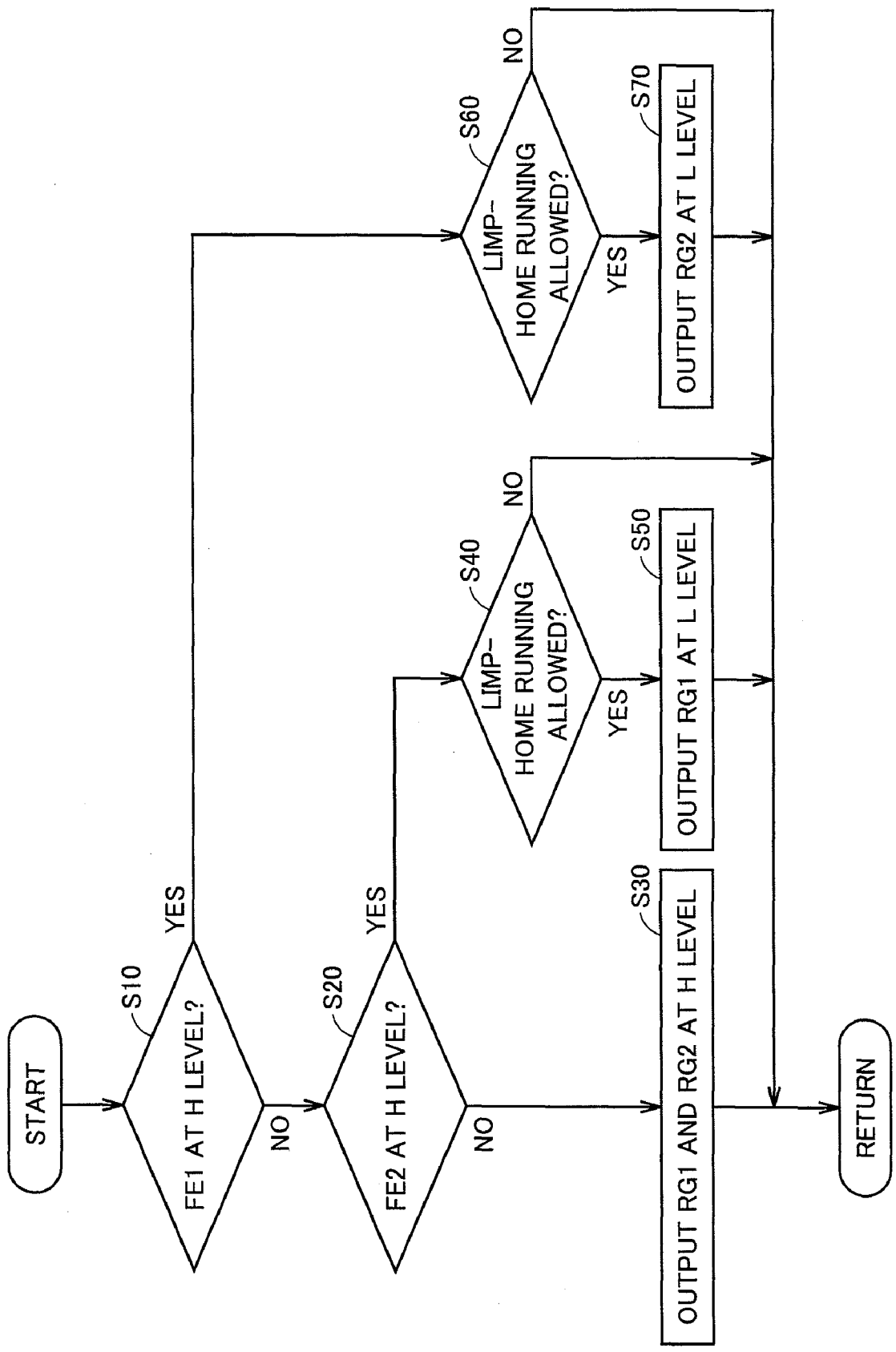
FIG. 4 is a flowchart of the control configuration of the shut down control unit shown in FIG. 3.

FIG. 4 is a flowchart of the control configuration of shut down control unit 505 of FIG. 3. The process of this flowchart is called from the main routine and executed at an interval of a predetermined time or when a predetermined condition is established.

Referring to FIG. 4, shut down control unit 505 determines whether fail signal FE1 from inverter 10 is at an H (logical high) level or not (step S10). When determination is made that fail signal FE1 is at an L (logical low) level by shut down control unit 505 (NO at step S10), determination is then made whether fail signal FE2 from inverter 20 is at an H level or not (step S20).

When shut down control unit 505 determines that fail signal FE2 is also at an L level (NO at step S20), shut down permit signals RG1 and RG2 of an H level are provided to AND gates 30 and 40, respectively (step S30).

When determination is made that fail signal FE2 is at an H level at step S20 (YES at step S20), shut down control unit 505 determines whether limp-home running by engine 4 using motor generator MG1 is allowed or not based on limp-home signal LIMP (step S40). When shut down control unit 505 determines that limp-home running is allowed (YES at step S40), shut down permit signal RG1 of an L level is output to AND gate 30 (step S50). When limp-home running is not allowed (NO at step S40), shut down control unit 505 terminates the series of steps without pulling down shut down permit signal RG1 to an L level.

When determination is made that fail signal FE1 is at an H level at step S10 (YES at step S10), shut down control unit 505 determines whether limp-home running is allowed or not using motor generator MG2 alone based on limp-home signal LIMP (step S60). When shut down control unit 505 determines that limp-home running is allowed (YES at step S60), shut down permit signal RG2 of an L level is output to AND gate 40 (step S70). When limp-home running is not allowed (NO at step S60), shut down control unit 505 terminates the series of steps without pulling down shut down permit signal RG2 to an L level.

The entire operation of hybrid vehicle 100 will be described with reference to FIG. 1 again. Inverters 10 and 20 receive supply of DC power from storage device B. Capacitor C smoothes the voltage between power supply line PL and ground line SL.

ECU 50 generates signal PWM1 by the method set forth above based on voltage Vm, torque command value TR1, and motor current MCRT1, and provides the generated signal PWM1 to inverter 10. ECU 50 generates signal PWM2 by the method set forth above based on voltage Vm, torque command value TR2 and motor current MCRT2, and outputs the generated signal PWM2 to inverter 20.

Accordingly, inverter 10 converts the DC power from storage device B, smoothed by capacitor C, into AC (Alternating Current) power to drive motor generator MG1. Inverter 20 converts the DC power from storage device B, smoothed by capacitor C, into AC power to drive motor generator MG2. Accordingly, motor generator MG1 generates the torque designated by torque command value TR1, whereas motor generator MG2 generates the torque designated by torque command value TR2.

Motor generator MG1 is coupled to engine 4 via power split mechanism 2. Motor generator MG2 is coupled to wheel FW via power split mechanism 2. Motor generator MG1 starts engine 4, or generates electric power using the output of engine 4. Motor generator MG2 drives wheel FW, or generates electric power in a regenerative braking mode when the brake is pressed down. Therefore, motor generator MG1 is mainly driven in a regeneration mode generating electric power using the output of engine 4, whereas motor generator MG2 is driven mainly in a power running mode generating the motive power of wheel FW.

Consider the case where inverter 20 detects excessive current and fail signal FE2 is rendered active when motor generator MG1 is in a regeneration mode and motor generator MG2 is in a power running mode.

When (or during) fail signal FE2 is inactive, ECU 50 renders active both shut down permit signals RG1 and RG2 to be output to AND gates 30 and 40, respectively, regardless of the level of the electric power generated by motor generator MG1.

When fail signal FE2 is rendered active, AND gate 30 immediately renders active shut down signal DWN1 in response to activation of fail signal FE2 since shut down permit signal RG1 from ECU 50 is active. Therefore, inverter 10 is immediately shut down in response to activation of fail signal FE2.

Thus, inverter 10 that drives motor generator MG1 in a regeneration mode is immediately shut down in hardware when motor generator MG2 in a power running mode is shut down by failure or the like.

When inverter 10 is shut down and motor generator MG1 is stopped, limp-home running using motor generator MG1 and engine 4 cannot be realized. In the first embodiment, ECU 50 renders inactive shut down permit signal RG1 output to AND gate 30 when limp-home signal LIMP is active and limp-home running is allowed. Accordingly, AND gate 30 renders shut down signal DWN1 inactive, whereby the shut down state of inverter 10 is canceled. Accordingly, inverter 10 is operable, and limp-home running using motor generator MG1 and engine 4 is allowed.

The above embodiment is based on the case where, when the fail signal is rendered active in an inverter corresponding to one of the motor generators, the other inverter is shut down, regardless of the operation mode (power running mode or regeneration mode) of motor generators MG1 and MG2. Alternatively, upon determining the operation modes of motor generators MG1 and MG2, and when the fail signal of the inverter corresponding to the motor generator in a power running mode is rendered active and the other motor generator is in a regeneration mode, the inverter corresponding to the other motor generator may be shut down. Determination of the operation mode of the motor generator can be made based on the signs of each of the torque command value and motor speed.

In the first embodiment, ECU 50 renders shut down permit signals RG1 and RG2 active regardless of the electric power generating state of motor generators MG1 and MG2 when fail signals FE1 and FE2 are inactive. Each of AND gates 30 and 40 immediately renders the shut down signal active and provides the active shut down signal to the corresponding inverter when the fail signal from an inverter other than the corresponding inverter is rendered active. According to the first embodiment, the margin for capacitor C in consideration of delay in the operation process does not have to be ensured, allowing reduction in the margin of capacitor C. As a result, capacitor C can be reduced in size.

In the first embodiment, ECU 50 renders inactive the shut down permit signal corresponding to the inverter that is shut down if limp-home running is allowed after any of inverters 10 and 20 is shut down in response to a shut down signal. Accordingly, the other inverter is operable even if the inverter rendering the fail signal active is stopped. According to the first embodiment, limp-home can be implemented using a motor generator corresponding to an inverter other than the inverter in error.

Second Embodiment

Figure 5:
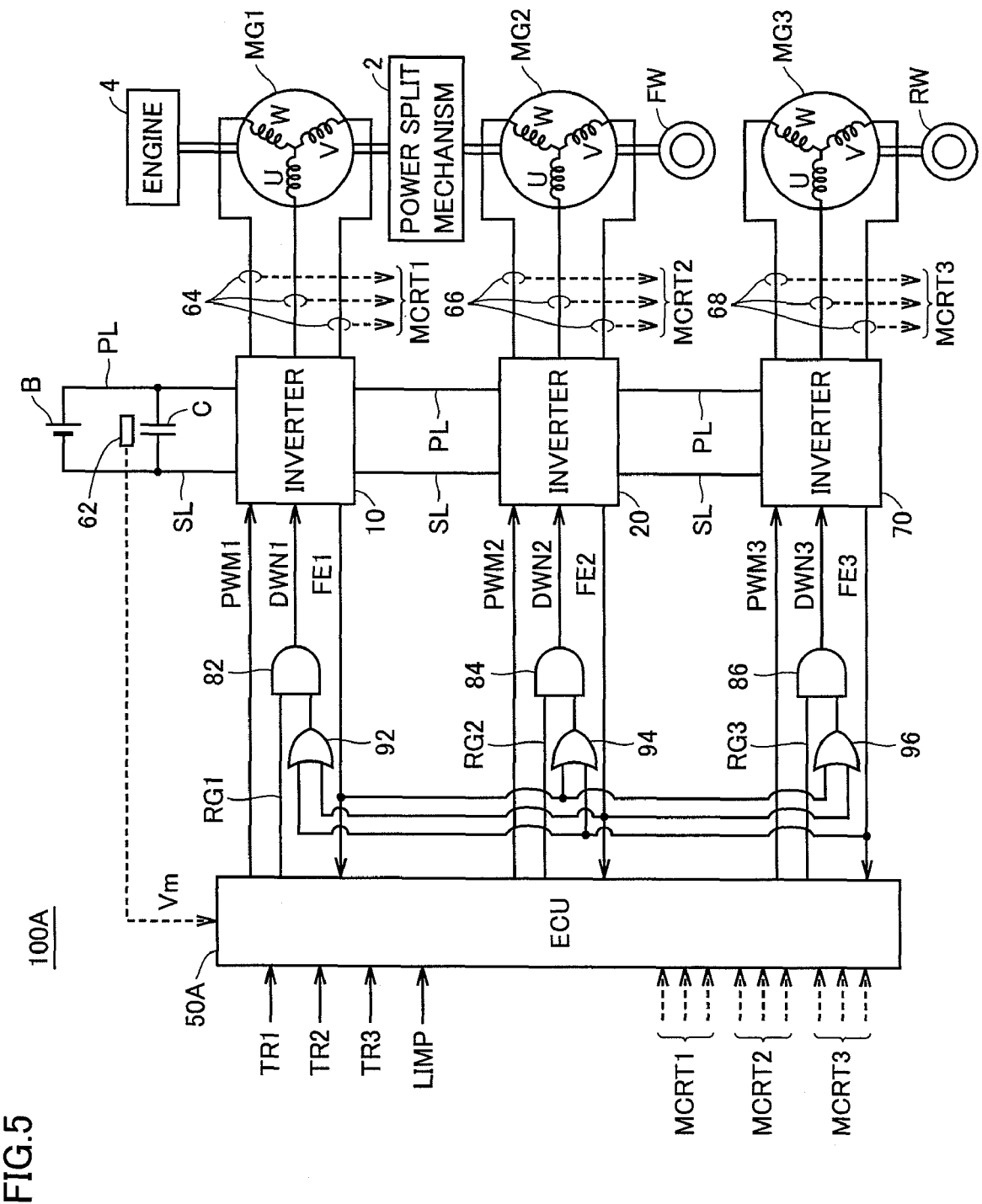
FIG. 5 is a schematic block diagram of a hybrid vehicle shown as an example of a vehicle according to a second embodiment of the present invention.

Referring to FIG. 5, a hybrid vehicle 100A according to a second embodiment of the present invention further includes a motor generator MG3, an inverter 70, an AND gate 86, an OR gate 96, and a current sensor 68, based on the configuration of hybrid vehicle 100 according to the first embodiment shown in FIG. 1. Hybrid vehicle 100A includes an ECU 50A instead of ECU 50. Further, hybrid vehicle 100A includes a circuit formed of an AND gate 82 and an OR gate 92, instead of AND gate 30, and a circuit formed of AND gate 84 and an OR gate 94, instead of AND gate 40.

Motor generator MG3 is incorporated in hybrid vehicle 100A as an electric motor driving a wheel RW. Wheel FW driven by motor generator MG2 is a front wheel, and wheel RW is a rear wheel.

Inverter 70 is provided corresponding to motor generator MG3, and is connected to power supply line PL and ground line SL, parallel to inverters 10 and 20. Inverter 70 has a configuration similar to that of inverter 10 shown in FIG. 2. Therefore, inverter 70 drives motor generator MG3 in a power running mode or regeneration mode based on a signal PWM3 from ECU 50A. Inverter 70 renders fail signal FE3 active when excessive current flows due to failure or the like in motor generator MG3. Inverter 70 is shut down when shut down signal DWN3 received from AND gate 86 is rendered active.

OR gate 92 takes the OR operation of fail signals FE2 and FE3 to provide the operation result to AND gate 82. AND gate 82 tales the AND operation of the output from OR gate 92 and shut down permit signal RG1 from ECU 50A to provide the operation result to inverter 10 as shut down signal DWN1.

OR gate 94 tales the OR operation of fail signals FE1 and FE3 to provide the operation result to AND gate 84. AND gate 84 takes the AND operation of the output from OR gate 94 and shut down permit signal RG2 from ECU 50A to provide the operation result to inverter 20 as shut down signal DWN2.

OR gate 96 takes the OR operation of fail signals FE1 and FE2 to provide the operation result to AND gate 86. AND gate 86 takes the AND operation of the output from OR gate 96 and shut down permit signal RG3 from ECU 50A to provide the operation result to inverter 70 as shut down signal DWN3.

Current sensor 68 detects motor current MCRT3 flowing to motor generator MG3, and provides the detected motor current MCRT3 to ECU 50A.

ECU 50A receives voltage Vm from voltage sensor 62, and motor currents MCRT1-MCRT3 from current sensors 64, 66, and 68, respectively. ECU 50A also receives torque command values TR1-TR3 from an external ECU not shown.

Based on each of these signals, ECU 50A generates signals PWM1-PWM3 used to drive motor generators MG1-MG3, respectively, by the method set forth above, and provides the generated signals to inverters 10, 20, and 70, respectively.

ECU 50A receives fail signals FE1-FE3 from inverters 10, 20 and 70, respectively, and receives limp-home signal LIMP from an external ECU. ECU 50A generates shut down permit signals RG1-RG3 based on each of these signals, and provides generated shut down permit signals RG1-RG3 to AND gates 82, 84 and 86, respectively.

More specifically, when all of fail signals FE1-FE3 are inactive, i.e. all of inverters 10, 20 and 70 are proper, ECU 50A renders shut down permit signals RG1-RG3 active for output to AND gates 82, 84 and 86, respectively.

Further, when fail signal FE1 is active, i.e. when an error is detected at inverter 10, ECU 50A renders shut down permit signals RG2 and RG3 inactive in response to activation of limp-home signal LIMP, and provides the inactive signals to AND gates 84 and 86, respectively. In response, AND gates 84 and 86 render shut down signals DWN2 and DWN3 inactive, respectively, whereby the shut down state of inverters 20 and 70 is canceled and motor generators MG2 and MG3 are operable. Thus, limp-home running using motor generators MG2 and MG3 is allowed.

In a similar manner, when limp-home signal LIMP is rendered inactive when fail signal FE2 is active, ECU 50A renders shut down permit signals RG1 and RG3 inactive for output to AND gates 82 and 86. When limp-home signal LIMP is rendered active when fail signal FE3 is active, ECU 50A renders shut down permit signals RG1 and RG2 inactive for output to AND gates 82 and 84, respectively. Accordingly, limp-home running using motor generators MG1 and MG3 is allowed when inverter 20 is in error. When inverter 70 is in error, limp-home running using motor generators MG1 and MG2 is allowed.

The remaining configuration of ECU 50A is similar to that of ECU 50 of the first embodiment. The remaining configuration of hybrid vehicle 100A is similar to that of hybrid vehicle 100 of the first embodiment.

In the second embodiment, ECU 50A renders shut down permit signals RG1-RG3 active regardless of the electric power generating state of motor generators MG1-MG3, prior to activation of a fail signal in any of inverters 10, 20 and 70. Therefore, activation of any of fail signals FE1-FE3 causes immediate activation of the shut down signal corresponding to an inverter other than the inverter rendering the fail signal active. As a result, the corresponding inverter is shut down immediately.

When limp-home signal LIMP is rendered active to enter a limp-home allowable state, ECU 50A renders inactive shut down permit signals corresponding to inverters other than the inverter rendering the fail signal active. Accordingly, the shut down signals corresponding to these inverters are rendered inactive, and the shut down state of these inverters is canceled. Thus, the inverters other than the inverter rendering the fail signal active are operable, allowing limp-home running using motor generators corresponding to the operable inverters.

The above description is based on the case where there are three motor generators. The present invention is readily extendable to the case where there are four or more motor generators. For example, the present invention is applicable to the case where an inverter for the air conditioner, for example, is further connected parallel to inverters 10, 20 and 70.

Even in the case of three or more motor generators, the margin of capacitor C can be reduced without having to ensure the margin of capacitor C taking into consideration delay in operation process, likewise the first embodiment. Further, limp-home using motor generators corresponding to inverters other than ah abnormal inverter can be implemented, likewise the first embodiment.

Each of the embodiments set forth above is described based on a hybrid vehicle as an example of a vehicle of the present invention. The present invention is also applicable to an electric vehicle, a fuel-cell electric vehicle having a fuel cell mounted as the DC power source, or the like.

In the above description, motor generators MG1-MG3 correspond to "n electric motors" in the present invention. Capacitor C corresponds to "capacitive element" in the present invention. Inverters 10, 20 and 70 correspond to "n drive devices" in the present invention. ECUs 50 and 50A correspond to "control device" of the present invention. Further, AND gates 30 and 40 correspond to "n shut down circuits" in the present invention. The circuit including OR gate 92 and AND gate 82, the circuit including OR gate 94 and AND gate 84, and the circuit including OR gate 96 and AND gate 86 correspond to "n shut down circuits" of the present invention.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An electric motor drive apparatus driving n (n is a natural number of at least 2) electric motors in a power running mode or regeneration mode, comprising:
a capacitive element that smoothes DC voltage,
n drive devices that correspond to said n electric motors and are connected in parallel to said capacitive element, each drive device driving a corresponding electric motor based on DC voltage from said capacitive element and activating and outputting a fail signal when detecting a predetermined error,
a control device generating n shut down permit signals to permit shut down of said n drive devices, respectively, wherein shut down of said n drive devices is based on receiving at least one fail signal, said control device receiving said fail signal from each of said n drive devices, and
n shut down circuits, each of said n shut down circuits corresponding to one of said n drive devices,
said control device outputting said n shut down permit signals to said n shut down circuits, respectively, regardless of a power generating state of said n electric motors;
at least one shut down circuit outputting a shut down signal designating shut down of the drive device corresponding to said at least one shut down circuit to said corresponding drive device when at least one activated fail signal is received from at least one non-corresponding drive device.

2. The electric motor drive apparatus according to claim 1, wherein said control device inactivates, when a predetermined condition is established after said corresponding drive device is shut down, a shut down permit signal corresponding to said corresponding drive device that is shut down.

3. The electric motor drive device according to claim 2, wherein said predetermined condition is established when a limp-home operation by an electric motor corresponding to said corresponding drive device that is shut down is allowed.

4. The electric motor drive apparatus according to claim 1, wherein said predetermined error is detected when excessive current flows to at least one semiconductor device in one of n drive devices.

5. A vehicle comprising:
an internal combustion engine,
n electric motors, and
the electric motor drive apparatus of claim 1, wherein
said n electric motors include first and second motor generators,
said n drive devices in said electric motor drive apparatus include first and second inverters driving said first and second motor generators, respectively,
said n shut down circuits in said electric motor drive apparatus include first and second shut down circuits corresponding to said first and second inverters, respectively,
said first motor generator generates electric power using an output of said internal combustion engine, and
said second motor generator generates motive power of the vehicle.

6. The vehicle according to claim 5, wherein said control device included in said electric motor drive apparatus inactivates a shut down permit signal corresponding to said first inverter when a determination is made that limp-home running by said first motor generator and said internal combustion engine is allowed, following shut down of said first inverter in response to a shut down signal from said first shut down circuit.

* * * * *